Patented Apr. 26, 1949

2,468,260

UNITED STATES PATENT OFFICE 2,468,260

METHOD OF PRODUCING LITHIUM ALUMINUM HYDRIDE AND ALUMINUM HYDRIDE

Thomas R. P. Gibb, Jr., Marblehead, Mass., assignor to Metal Hydrides Incorporated, Beverly, Mass., a corporation of Massachusetts No Drawing. Application April 8, 1947, Serial No. 740,266

8 Claims. (Cl. 23—87)

This invention relates to the production of metal hydrides, such as lithium aluminum hydride.

Lithium aluminum hydride possesses valuable properties not possessed by other known metal hydrides. It is particularly useful as a reducing agent and in the synthesis of many organic compounds. Consequently, a method for producing it at low cost is very desirable.

Lithium aluminum hydride has been produced prior to the present invention by reacting substantially pure finely powdered lithium hydride with aluminum chloride in solution in diethyl ether. The reaction is represented by the equation:

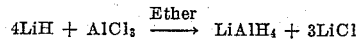

$$4\text{LiH} + \text{AlCl}_3 \xrightarrow{\text{Ether}} \text{LiAlH}_4 + 3\text{LiCl}$$

This reaction starts slowly and in order to proceed to completion has required an amount of lithium hydride about 40 per cent in excess of the theoretical amount. Due principally to the large excess of lithium hydride required and its present high cost, the cost of production of lithium aluminum hydride is extremely high. Obviously, the cost of lithium aluminum hydride would be reduced if the cost of an amount of lithium hydride required for its production could be reduced. The present invention accomplishes both of these objects.

It has been believed that substantially pure lithium hydride is required for the production of lithium aluminum hydride because the reaction starts slowly and because a large excess is required. The only substantially pure lithium hydride which has been available on the market has been produced by first obtaining lithium metal by electrolysis of anhydrous lithium chloride. The lithium metal thus obtained was converted to lithium hydride by heating the metal in the presence of hydrogen. Lithium hydride produced in this manner is expensive.

The present invention overcomes the above difficulties and provides a method for producing lithium aluminum hydride at a greatly reduced cost. The method of the invention utilizes lithium oxide as a relatively low cost starting material. In accordance with the invention, lithium oxide is reduced in a confined reaction zone and simultaneously converted to lithium hydride by heating with magnesium in the presence of hydrogen at a temperature, preferably, between 500° C. to 900° C. This results in the production of a mechanically inseparable mixture of lithium hydride and magnesium oxide. In place of magnesium other reducing materials may be used such as calcium, calcium hydride, silicon, ferrosilicon, etc. to obtain a mechanically inseparable mixture of lithium hydride and a refractory oxide. I presently prefer, however, to use magnesium. These products may be crushed easily to powder form.

Substantially pure lithium hydride may be produced from the mechanically inseparable mixture of lithium hydride and the refractory oxide. Thus, the mixture may be heated in a closed retort to distill out the lithium which may be condensed in a cooler part of the retort and then hydrided. I have discovered, however, that this is neither necessary nor desirable.

The mechanically inseparable mixture of lithium hydride and refractory oxide is insoluble in ethers but when this mixture, preferably in finely divided form or powder, is subjected to the action of a solution of aluminum chloride or bromide in an ether containing not more than six carbon atoms a reaction is obtained which may be represented as follows:

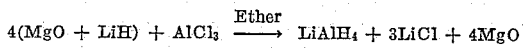

$$4(\text{MgO} + \text{LiH}) + \text{AlCl}_3 \xrightarrow{\text{Ether}} \text{LiAlH}_4 + 3\text{LiCl} + 4\text{MgO}$$

That this reaction takes place is of itself surprising but it is still more surprising and unexpected to discover that the amount of this mechanically inseparable mixture necessary is not more than about 10 per cent in excess of that theoretically required. Instead of being wholly inoperative as might be expected, the mechanically inseparable mixture of lithium hydride and refractory oxide is superior to substantially pure lithium hydride as a reactant in the production of lithium aluminum hydride. The reaction starts more quickly and a substantially smaller amount, calculated as lithium hydride, is required to carry the reaction to completion. The mechanically inseparable mixture of lithium hydride and refractory oxide possesses the added advantage of greater ease of handling since the neutral oxide in which the lithium hydride is embedded serves to protect the active lithium hydride from rapid deterioration by contact with carbon dioxide and moisture of the air. Substantially pure lithium hydride is hard and its reduction to powder form is difficult whereas the mechanically inseparable mixture of lithium hydride and refractory oxide may be crushed easily to powder form.

The present invention provides not only an economical method for producing lithium aluminum hydride and aluminum hydride but also an extremely satisfactory method for separating the lithium from a mechanically inseparable mixture of lithium hydride and refractory oxide to obtain the lithium in the form of lithium aluminum hydride, lithium halide or other salts or both.

As illustrative of suitable ethers which may be employed in the practice of the invention, I may mention diethyl, dimethyl, methyl-ethyl, di-isopropyl, methyl and ethyl cellosolve ethers and dioxane.

The invention is illustrated further by the following examples.

*Example I*

Lithium hydroxide or carbonate is calcined until it is substantially decomposed and transformed to lithium oxide. After cooling, this material is crushed and ground to a fine powder.

340 grams of this material are mixed with 240 grams of magnesium in the form of powder or small flakes. The mixture is placed in a metal container, tamped to reduce the volume and insure bettter contact between the particles of reagents, and the container placed in a closed metal retort of any standard design. After placing the cover on the retort, the air is exhausted and replaced by hydrogen. Then the retort is heated to a temperature of about 600° C. During the first period of heating the expansion of hydrogen in the retort is indicated on the gauge attached to the retort. When the temperature exceeds 500° C. and reaches 600° C., there is a sudden drop in pressure which is an indication of the absorption of hydrogen by the reacting material. Hydrogen is supplied to the retort to prevent formation of a vacuum. The end of the consumption of hydrogen in indicative of the end of the reaction. After cooling of the retort, the material is withdrawn from the retort. The product is a coarse powder consisting of small friable sinters in the form of small sponges.

*Example II*

A powdered mechanically inseparable mixture of MgO and LiH of such weight as to give a 10% excess over that stoichiometrically required by the reaction:

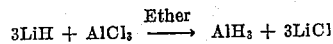

$$4LiH + AlCl_3 \xrightarrow{Ether} LiAlH_4 + 3LiCl$$

is placed in a flask filled with hydrogen, nitrogen, helium or other inert gas, and equipped with a reflux condenser and preferably a mechanical stirrer. Sufficient anhydrous diethyl ether is added to cover the powder and a nearly saturated solution of anhydrous AlCl₃ in anhydrous ether is added dropwise (the ethereal AlCl₃ being previously treated with Al powder to remove any free HCl). After 5% of the stoichiometric quantity of ethereal AlCl₃ has been added, the mixture is allowed to react nearly completely, being gently refluxed if necessary. Thereupon the balance of the ethereal AlCl₃ is added at such a rate that the reaction proceeds without undue vigor. The reaction mixture is allowed to stand two hours after completion of the reaction. The clear supernatant liquor is decanted under an inert gas, filtered, if desired, and evaporated to dryness under ether vapor or inert gas. The product may be obtained as a saturated ethereal solution or the evaporation may be carried further, preferably under vacuum to give a grayish to white crystalline or microcrystalline product.

*Example III*

To make AlH₃ the same procedure as described in Example II is followed except the quantities of reactants are determined from the equation:

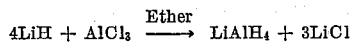

$$3LiH + AlCl_3 \xrightarrow{Ether} AlH_3 + 3LiCl$$

A 5% excess of LiH over that required stoichiometrically is used. The reaction may also be carried out by addition of the stoichiometric quantity of AlCl₃ to the ethereal solution of LiAlH₄ obtained in Example II.

Removal of ether from AlH₃ is much more difficult and must be carried out under high vacuum (order of 5 mm. or less).

I claim:

1. The method which comprises subjecting a mechanically inseparable mixture of lithium hydride and a refractory oxide to the action of a solution of an aluminum halide in diethyl ether thereby producing a solution of a metal hydride in ether and solid lithium halide, said aluminum halide being selected from the group consisting of aluminum chloride and aluminum bromide, and separating the solution of metal hydride from the solid lithium halide, said refractory oxide being the oxide of a solid reducing material capable of being used in the pyrometallurgical reduction of lithium oxide.

2. The method which comprises subjecting a mechanically inseparable mixture of lithium hydride and a refractory oxide to the action of a solution of aluminum chloride in an ether having not more than six carbon atoms thereby producing a solution of a metal hydride and solid lithium chloride, and separating the solution of metal hydride from the solid lithium chloride, said refractory oxide being the oxide of a solid reducing material capable of being used in the pyrometallurgical reduction of lithium oxide.

3. The method which comprises subjecting a mechanically inseparable mixture of lithium hydride and a refractory oxide to the action of a solution of aluminum chloride in diethyl ether thereby producing a solution of a metal hydride and solid lithium chloride, and separating the solution of metal hydride from the solid lithium chloride, said refractory oxide being the oxide of a solid reducing material capable of being used in the pyrometallurgical reduction of lithium oxide.

4. The method which comprises subjecting a mechanically inseparable mixture of lithium hydride and magnesium oxide to the action of a solution of an aluminum chloride in an ether having not more than six carbon atoms thereby producing a solution of a metal hydride and solid lithium chloride, and separating the solution of metal hydride from the solid lithium chloride.

5. The method which comprises subjecting a mechanically inseparable mixture of lithium hydride and a refractory oxide to the action of a solution of an aluminum halide in an ether having not more than six carbon atoms thereby producing a solution of a metal hydride in said ether and solid lithium halide, said aluminum halide being selected from the group consisting of aluminum chloride and aluminum bromide, and separating the solution of metal hydride from the solid lithium halide, said refractory oxide being the oxide of a solid reducing material capable of being used in the pyrometallurgical reduction of lithium oxide.

6. The method which comprises subjecting a mechanically inseparable mixture of lithium hydride and magnesium oxide to the action of a solution of an aluminum halide in an ether having not more than six carbon atoms thereby producing a solution of a metal hydride in said ether and solid lithium halide, said aluminum halide being selected from the group consisting of aluminum chloride and aluminum bromide, and separating the solution of metal hydride from the solid lithium halide.

7. The method which comprises subjecting a mechanically inseparable mixture of lithium hydride and magnesium oxide to the action of a solution of an aluminum halide in diethyl ether thereby producing a solution of a metal hydride in said ether and solid lithium halide, said aluminum halide being selected from the group consisting of aluminum chloride and aluminum bromide, and separating the solution of metal hydride from the solid lithium halide.

8. The method which comprises subjecting a mechanically inseparable mixture of lithium hydride and magnesium oxide to the action of a solution of aluminum chloride in diethyl ether thereby producing a solution of a metal hydride in said ether and solid lithium chloride, and separating the solution of metal hydride from the solid lithium chloride.

THOMAS R. P. GIBB, Jr.

REFERENCES CITED

The following references are of record in the file of this patent:

UNITED STATES PATENTS

| Number | Name | Date |
|---|---|---|
| 2,082,134 | Alexander | June 1, 1937 |
| 2,401,326 | Archibald et al. | June 4, 1946 |
| 2,408,748 | Alexander | Oct. 8, 1946 |
| 2,411,524 | Davis | Nov. 26, 1946 |

OTHER REFERENCES

Paneth: Radio Elements as Indicators, N. Y., M'Graw Hill Book Co. Inc., 1928, p. 92.

Schlesinger and Finholt, J. Am. Chem. Soc. 69, 1199 (1947).